US008050865B2

(12) United States Patent
Zhao et al.

(10) Patent No.: US 8,050,865 B2
(45) Date of Patent: Nov. 1, 2011

(54) SYSTEM AND METHOD FOR MEASURING RESISTIVITY PARAMETERS OF AN EARTH FORMATION

(75) Inventors: Jinsong Zhao, Sugar Land, TX (US);
Jorge O. Maxit, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 569 days.

(21) Appl. No.: 12/262,330

(22) Filed: Oct. 31, 2008

(65) Prior Publication Data

US 2010/0114492 A1    May 6, 2010

(51) Int. Cl.
*G01V 1/40* (2006.01)
(52) U.S. Cl. ............................................. 702/7
(58) Field of Classification Search ......... 702/7; 324/339, 324/368, 347, 303, 323; 219/200, 201, 213; 505/874, 873, 825; 427/63; 257/32, 9, 30, 257/31; 372/39, 43.01, 44.01; 399/66, 38
See application file for complete search history.

(56) References Cited

U.S. PATENT DOCUMENTS

| | | | |
|---|---|---|---|
| 5,585,727 A * | 12/1996 | Fanini et al. | 324/339 |
| 5,754,599 A | 5/1998 | Ling et al. | |
| 6,603,314 B1 * | 8/2003 | Kostelnicek et al. | 324/368 |
| 6,670,813 B2 * | 12/2003 | Strack | 324/323 |
| 7,010,061 B2 | 3/2006 | Subramanian | |
| 7,034,538 B2 * | 4/2006 | Strack et al. | 324/347 |
| 7,157,915 B2 | 1/2007 | Schoen et al. | |
| 7,957,904 B2 * | 6/2011 | Ziolkowski et al. | 702/7 |
| 2002/0101236 A1 * | 8/2002 | Wollin | 324/303 |
| 2003/0122547 A1 * | 7/2003 | Prammer | 324/368 |
| 2007/0035306 A1 | 2/2007 | Forgang et al. | |
| 2010/0017133 A1 * | 1/2010 | Ziolkowski et al. | 702/7 |

OTHER PUBLICATIONS

RF/IF Gain and Phase Detector AD8302, pp. 1-24, Analog Devices Inc., Norwood, MA 02062, USA. 2002.

* cited by examiner

*Primary Examiner* — Drew A Dunn
*Assistant Examiner* — Xiuquin Sun
(74) *Attorney, Agent, or Firm* — Cantor Colburn LLP

(57) ABSTRACT

Disclosed herein is a method of measuring a resistivity parameter of an earth formation. The method includes: applying a first electric measurement current including a first series of pulses to a first electrode and inducing a first formation current in the earth formation; applying a second electric measurement current including a second series of pulses to a second electrode and inducing a second formation current in the earth formation, the first series of pulses and the second series of pulses occupying distinct portions of a time domain in a selected time window; measuring the first measurement current, the first formation current, the second measurement current and the second formation current by coherent in-phase demodulation; and calculating at least one resistivity parameter by i) comparing the first measurement current to the first formation current and ii) comparing the second measurement current to the second formation current. A system for measuring a resistivity parameter of an earth formation is also provided.

20 Claims, 4 Drawing Sheets

SYSTEM AND METHOD FOR MEASURING RESISTIVITY PARAMETERS OF AN EARTH FORMATION

BACKGROUND

Various formation evaluation (FE) tools are used in hydrocarbon exploration and production to measure properties of geologic formations during or shortly after the excavation of a borehole. The properties are measured by formation evaluation tools and other suitable devices, which are typically integrated into a bottom hole assembly (BHA).

FE tools include various types of sensors, such as resistivity sensors, which measure formation resistivity by passing an electrical current through a formation and measuring a change in the current through the formation. This may be accomplished by physically coupling a measurement electrode and a return or ground electrode to the formation, emitting a current into the formation between the measurement and ground electrodes, and measuring electrical potential differences between the electrodes. The resulting voltage/current (V/I) ratios are converted to apparent resistivities, using algorithms based upon the electrode array geometries and potential theory. Alternatively, the electrodes are capacitively coupled to the formation. In other alternatives, a transmitting antenna inductively couples current to the formation, which is in turn received by the same or a separate antenna.

Some resistivity sensors utilize simple equal potential drivers to attempt to eliminate current leakages from the resistivity buttons and pads. However, such configurations often introduce an operational delay that causes resistivity parameters such as impedance measured by the resistivity sensor to include other factors beyond a formation resistivity, resulting in potentially inaccurate measurements.

SUMMARY

Disclosed herein is a method of measuring a resistivity parameter of an earth formation. The method includes: applying a first electric measurement current including a first series of pulses to a first electrode and inducing a first formation current in the earth formation; applying a second electric measurement current including a second series of pulses to a second electrode and inducing a second formation current in the earth formation, the first series of pulses and the second series of pulses occupying distinct portions of a time domain in a selected time window; measuring the first measurement current, the first formation current, the second measurement current and the second formation current by coherent in-phase demodulation; and calculating at least one resistivity parameter by i) comparing the first measurement current to the first formation current and ii) comparing the second measurement current to the second formation current.

Also disclosed herein is a system for measuring a resistivity parameter of an earth formation. The system includes: an electric power source; a generator coupled to the power source and configured to emit a pulsed current having a selected frequency; a first electrode configured to convey a first measurement current including a first series of pulses into the earth formation and induce a first formation current therein; a second electrode configured to convey a second measurement current including a second series of pulses into the earth formation and induce a second formation current therein, the first series of pulses and the second series of pulses occupying distinct portions of a time domain in a selected time window; a first coherent in-phase demodulation detector configured to receive the first formation current calculate a first difference between the first measurement current and the first formation current; a second coherent in-phase demodulation detector configured to receive the second formation current calculate a second difference between the second measurement current and the second formation current; and a processor configured to estimate the resistivity parameter based on the measured first difference and second difference.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
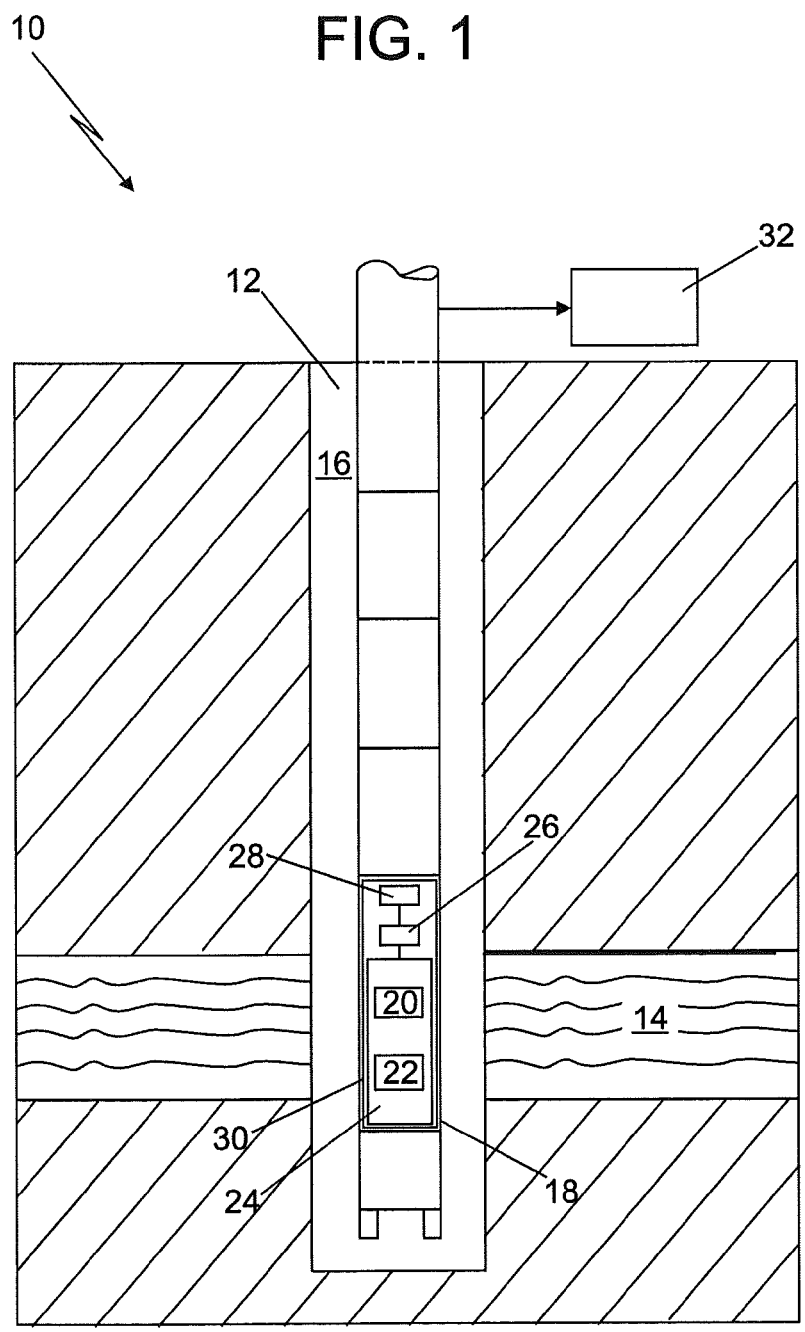
FIG. 1 depicts an exemplary embodiment of a logging system.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "borehole" or "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area).

As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging. As referred to herein, "downhole" or "down a borehole" refers to a location in a borehole away from a surface location at which the borehole begins.

A formation evaluation (FE) downhole tool 18 is configured to be disposed in the well logging system 10 at or near the downhole portion of the drillstring 11 such as in a bottomhole assembly (BHA), and includes a plurality of capacitative electrodes or buttons 20, 22 for measuring a resistivity parameter of the formation 14. The electrodes are disposed on a conductive pad 24, and are configured to induce an electric current in the formation 14. Although this embodiment includes two electrodes 20, 22, any number of electrodes may be included. In other embodiments, the tool 18 includes additional electrodes as needed, including focusing electrodes and return electrodes.

In one embodiment, the tool 18 includes an electronics unit 26 for storing and/or processing data generated by the electrodes 20, 22, and/or controlling operation of the tool 18. A communications assembly 28 for transmitting data and communication signals between the tool 18 and a remote processor may also be included. The communications assembly 28 includes a transmission device such as any number of transmitting and/or receiving antennas. The electrodes 20, 22, the communications assembly 28 and/or the electronics unit 26 may be included in a common housing 30. With respect to the teachings herein, the housing 30 may represent any structure used to support at least one of the electrodes 20, 22, the communications assembly 28, and the electronics unit 26.

In one embodiment, the tool 18 is operably connected to a surface processing unit 32, which may act to control the tool 18, and may also collect and process data generated by the electrodes 20, 22 during a logging and/or drilling process. In one embodiment, the surface processing unit 32, includes any number of transmitting and/or receiving antennas to receive signals from, and/or send signals to, the communications assembly 28. In one embodiment, the surface processing unit 28 is connected to the tool 18 via wireline or other physical connection.

The surface processing unit 32 may also include components as necessary to provide for processing of data from the tool 18. Exemplary components include, without limitation, at least one processor, storage, memory, input devices, output devices and the like. As these components are known to those skilled in the art, these are not depicted in any detail herein.

Although the present embodiment provides the surface processing unit 32 to receive and process data, any number or types of processors, circuits or devices for controlling operation of the tool 18, processing data and/or communicating with the communications assembly 28 may be provided. Such devices may include any suitable components, such as storage, memory, input devices, output devices and others. In addition, the tool 18 may include any number of additional sensors or receivers to measure various properties of the formation 14 as the tool 18 is lowered down the borehole 12. Such sensors include, for example, nuclear magnetic resonance (NMR) sensors, porosity sensors, gamma ray sensors, seismic receivers and others.

Figure 2:
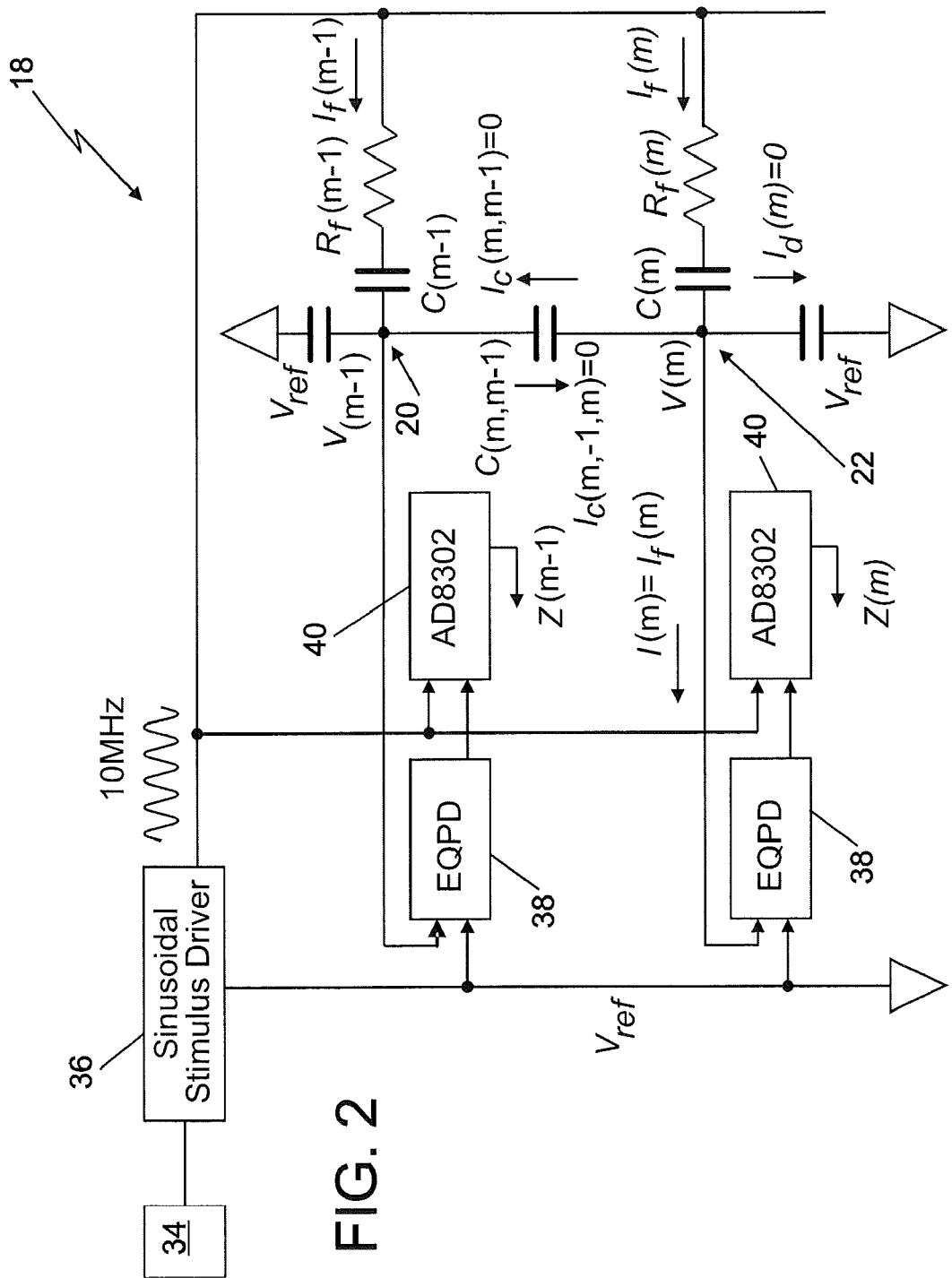
FIG. 2 depicts a circuit diagram of an exemplary embodiment of a logging tool of FIG. 1.

Referring to FIG. 2, a circuit diagram showing the principles of operation of one embodiment of the tool 18 is shown. An electric power source 34 coupled to a pulsed current generator such as a sinusoidal stimulus driver 36 produces a signal having a voltage "$V_{ref}$" and a frequency or frequency band that is applied to the measurement electrodes 20, 22. An example of a measurement current frequency is 10 MHz. Each measurement electrode 20, 22 is coupled to an equal potential driver (EQPD) 38 that equalizes the potential differences as zero across all of the electrodes 20, 22, so that:

$$V(m-1)=V(m)=V_{ref} \tag{1}$$

where "V(m−1)" is the voltage applied to the first measurement electrode 20 and V(m) is the voltage applied to the second measurement electrode 22. The EQPD 38 is disposed on each measurement electrode 20, 22 to reduce or eliminate current leakages in adjacent electrodes 20, 22 and the pad 24 body.

Each electrode 20 and 22 receives a measurement current "I(m−1)" and "I(m)", respectively, having a selected frequency. The measurement current induces a magnetic field that in turn induces a respective formation frequency "$I_f(m-1)$" and "$I_f(m)$" into the formation 14. The number of measurement electrodes is denoted by "m", which is any suitable number of electrodes. Although the embodiment described herein includes two electrodes, the tool 18 is not limited to this number or configuration of electrodes. In the present embodiment, the electrodes 20 and 22 are represented by "m−1" and "m" respectively.

Capacitors C(m−1) and C(m) represent a capacitive coupling between each measurement electrode 20, 22 and the formation 14, which has a corresponding resistivity "$R_f$". Electric current I(m−1), I(m), from each measurement electrode 20, 22 is coupled to the formation 14, flows through the formation 14 and returns to the measurement electrode 20, 22. A voltage detector measures the voltage $V_{ref}$ across the measurement electrode 20, 22 and controls the voltage and/or current of the power source 34 to maintain a constant voltage.

A detector 40 is also disposed on or near the measurement electrode 20, 22 for measuring various parameters of the current $I_f(m-1)$, $I_f(m)$ received from the formation 14. Examples of parameters include current If(m−1) and If(m), voltage V(m) and V(m−1), phase and amplitude. An example of the detector 40 is a AD8302 Gain and Phase Detector. The detector 40 is electrically connected to the EQPD 38 so that the measurement signal is applied to both the formation 14 and the detector 40. In one embodiment, the detector 40 measures a gain, a signal magnitude ratio and/or a phase difference between the measurement current I(m−1), I(m) and the respective formation current $I_f(m-1)$, $I_f(m)$. In one embodiment, the detector measures an impedance "Z(m)" or "Z(m−1)" based on $V_{ref}$ and I(m) or I(m−1) in term of amplitude and phase. The resistivity may then be calculated from these parameters.

As a result of the equal potential driving, a diffusion current "$I_c(m, m-1)$" from the second electrode 22 to the first electrode 20 is equal to zero. In addition, a cross talking current $I_c(m-1, m)$ from the first electrode 20 to the second electrode 22, as well as a body-leakage current $I_d(m)$, are equal to zero. Accordingly, the current measured by the EQPD 38 is equal to the formation current $I_f(m)$.

In some instances, the simple EQPD circuit includes an extra operational delay Δθ when the measurement signal is applied. Accordingly, in these instances:

$$V(m-1) \neq V(m) \neq V_{ref} \tag{2}$$

and $$I(m)=I_f(m)+I_c(m-1,m)-I_c(m,m-1)-I_d(m) \tag{3}$$

Thus, the output Z(m−1), Z(m) from the detector 40, such as the AD8302 detector, is not only a result of the impedance from C(m−1), C(m) and $R_f(m-1)$, $R_f(m)$. As shown in equation (3), the output from the AD8302 will be even more heavily influenced by cross-talk or other conditions if the EQPD is not included.

Figure 3:
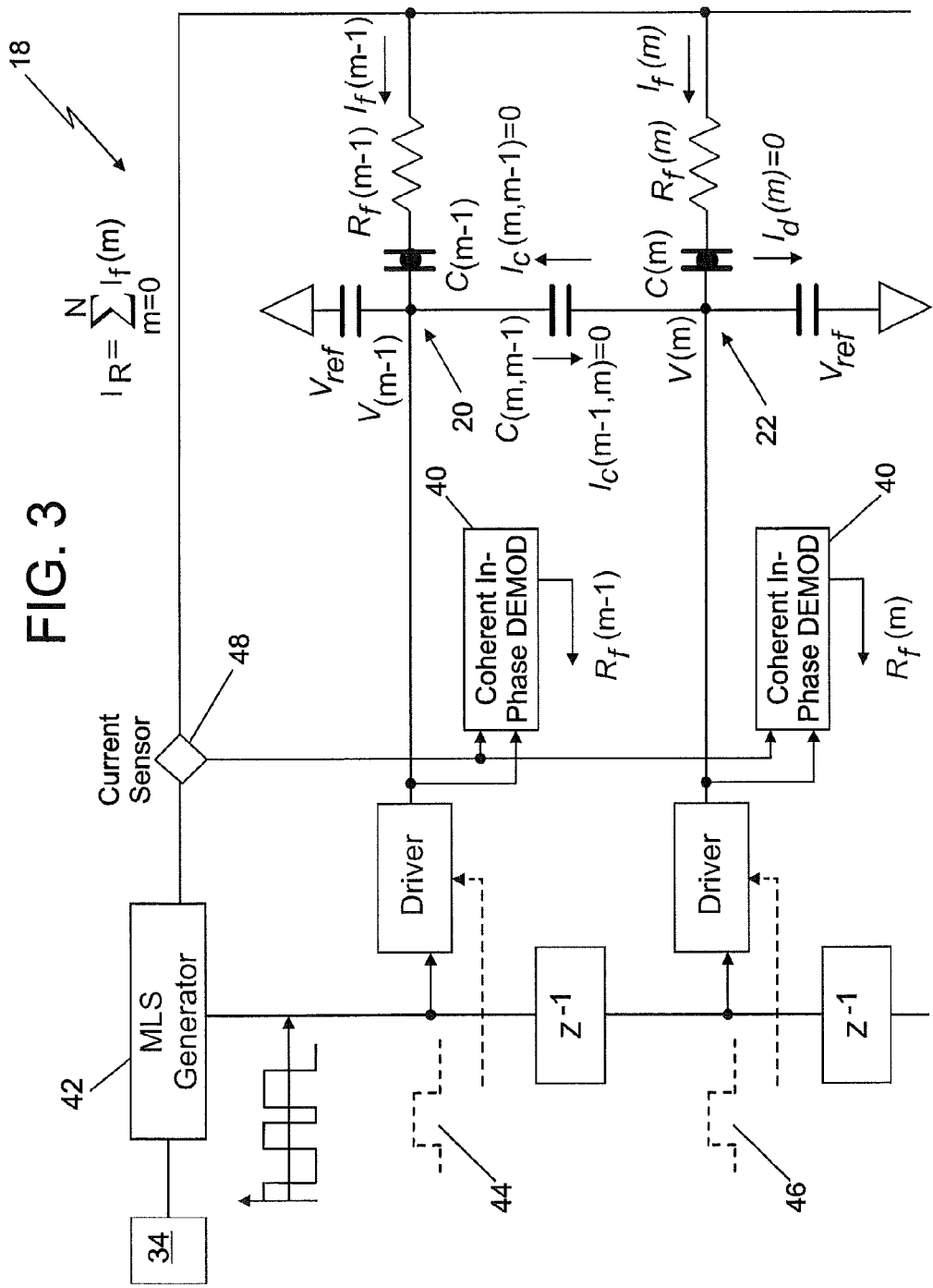
FIG. 3 depicts a circuit diagram of another exemplary embodiment of a logging tool of FIG. 1.

Referring to FIG. 3, another embodiment of the tool 18 is shown, which utilizes orthogonal measurement signals to stimulate formation currents among the electrodes 20, 22 without the use of EQPDs, and also utilizes coherent in-phase demodulation to measure resistivity parameters.

A current signal generator 42 is connected to the power source 34 and coupled to each measurement electrode 20, 22. The signal generator 42 generates a first measurement signal I(m−1) and a second measurement signal I(m) that is orthogonal to the first measurement signal. In one embodiment, as referred to herein, "orthogonal" denotes that the individual pulses in the first measurement signal do not overlap the pulses of the second signal in the time domain, i.e., the first series of pulses and the second series of pulses occupy distinct portions of the time domain in a selected time window. In another embodiment, the first measurement electrode 20 includes a conductive coil having a magnetic dipole moment, and the second measurement electrode 22 includes a conductive coil having a second magnetic dipole moment that is orthogonal to the first dipole moment.

In one embodiment, the measurement electrodes 20, 22 are a plurality of electrodes disposed on the pad 24 along a selected direction, such as a direction parallel to a major axis of the tool 18 or perpendicular to the axis. The measurement electrodes 20, 22 have alternating orthogonality, i.e., each measurement electrode 20, 22 is orthogonal to an adjacent measurement electrode 20, 22.

An example of the current signal generator 42 is a Maximum Length Sequence (MLS) generator, although any suitable generator capable of emitting a pulsed signal may be used. In one embodiment, the generator 42 generates a first series of first rectangular pulses as the first signal for the first electrode and a second series of second rectangular pulses as the second signal for the second electrode. In one embodiment, the generator 42 is an MLS generator, and the first and second series are identical MLS sequences.

In one embodiment, the current signal generator 42 is configured as a time division modulator (TDM). The current signal generator modulates the time window in which each measurement current I(m−1), I(m) is emitted so that each measurement current I(m−1), I(m) is emitted during a unique time window, and accordingly none of the measurement currents are emitted at the same time or overlap in time. Such modulation may further reduce cross-talking interferences. Examples of such modulated measurement currents are shown as modulated signals 44, 46.

In one embodiment, the tool 18 includes a current sensor 48 to measure the current through the measurement electrode 34, such as a measurement circuit that measures a voltage drop across a resistor. Any suitable device or technique for measuring current may be used. Current readings from the current sensor 48 are supplied to the detectors 40.

In one embodiment, each detector 40 includes a coherent in-phase demodulation device 40. The demodulation device 40 receives modulated measurement signals I(m), I(m−1) and the modulated formation signal If(m), If(m−1), and generates comparative parameters such as gain and phase shift between the signals. Resistivity parameters such as resistivity and impedance are calculated from the demodulation device data. An example of the detector 40 is an AD8333 dual-phase shifter and I/Q demodulator that enables coherent summing and phase alignment of multiple analog data channels.

As shown in FIG. 3, the total current IR through the formation is a sum of the currents $I_f(m)$ and $I_f(m-1)$ for a number "N" of measurement electrodes. As indicated above, the number N of measurement electrodes is not limited:

$$I_R = \sum_{m=0}^{N} I_f(m) \quad (4)$$

The following exemplary calculations demonstrate the tool 18 ability to eliminate cross-talk and leakage currents in determining resistivity parameters. The following relationships are used, for example, in the in-phase demodulation process, where multiple input currents are used to derive the resistivity $R_f$:

$$\int V(i) * (r_D * I_f(j)) dt = r_D \int V(i) * I_f(j) = \begin{cases} \neq r_D A & \text{when } i \neq j \\ = 0 & \text{when } i = j \end{cases} \quad (5)$$

where V(i) is the measured voltage signal of a first signal (e.g., the first measurement current) having a first phase "i", $r_D$ is a resistance of a conductor, A is an area, $I_f(j)$ is a second measured current signal having a second phase "j". Thus, for a channel "m" corresponding to the electrode, the following relationships are derived:

$$\int V(m) * (r_D * I_R) dt = r_D \int V(m) * \sum_{j=0}^{N} I_f(j) dt \quad (6)$$

$$= r_D \int V(m) * I_f(m) dt$$

$$= R_f(m)$$

From equations (4), (5), and (6), it can be seen that the cross talking $I_c(m-1,m)$ in between adjacent channels is rejected during the demodulation process. Because the process is a coherent in-phase demodulation process, it can also be shown that the leakage current $I_d(m)$ does not affect the $R_f(m)$.

In one embodiment, a diffusion current $I_c(m,m-1)$ may still affect the $I_f(m-1)$, $I_f(m)$. However, for resistivity measurements, the diffusion current only affects the spatial resolution of the resistivity measurements, and accordingly may benefit the resistivity image quality as the diffusion current $I_c(m,m-1)$ shows an intrinsic spatial filtering property.

Figure 4:
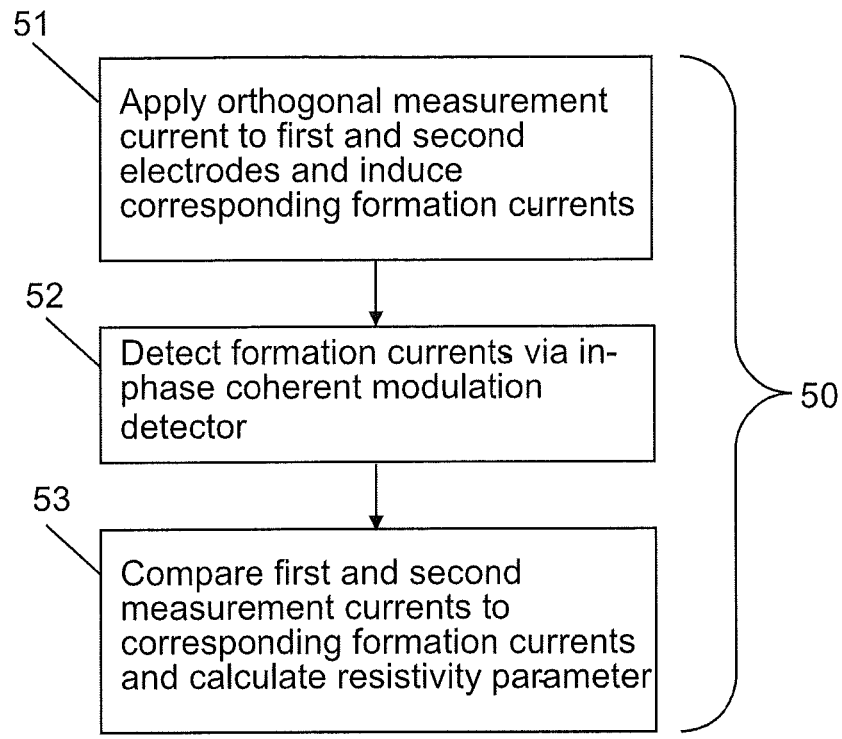
FIG. 4 is a flowchart depicting an exemplary embodiment of a method of measuring a resistivity parameter of an earth formation.

FIG. 4 illustrates a method 50 for measuring a resistivity parameter of the formation 14. The method 50 includes one or more stages 51-53. In one embodiment, the method 50 includes the execution of all of stages 51-53 in the order described. However, certain stages may be omitted, stages may be added, or the order of the stages changed. Furthermore, the method 50 may be performed in conjunction with wireline measurement processes, LWD or MWD processes, drilling processes and any other suitable processes including resistivity measurement.

In the first stage 51, orthogonal measurement currents I(m−1) and I(m) are applied to the first and second electrodes 20, 22, respectively. Each electrode 20, 22 in response generates a magnetic field that induces a corresponding formation current $I_f(m-1)$, $I_f(m)$. In one embodiment, the measurement current is also applied directly to each coherent in-phase modulation detector 40 and/or data regarding the measurement current is supplied to the detector 40 via a current or voltage sensor.

In the second stage 52, the detector 40 receives the formation current I(m), I(m−1). The detector 40 demodulates the measurement current and the formation current via coherent in-phase demodulation.

In the third stage 53, the detector 40 or another suitable processor compares the measurement current to the formation current. Examples of such comparison include gain, phase shift, current change and voltage change. The detector calculates a resistivity parameter based on the comparison. Examples of resistivity parameters include impedance, resistance and resistivity.

Figure 5:
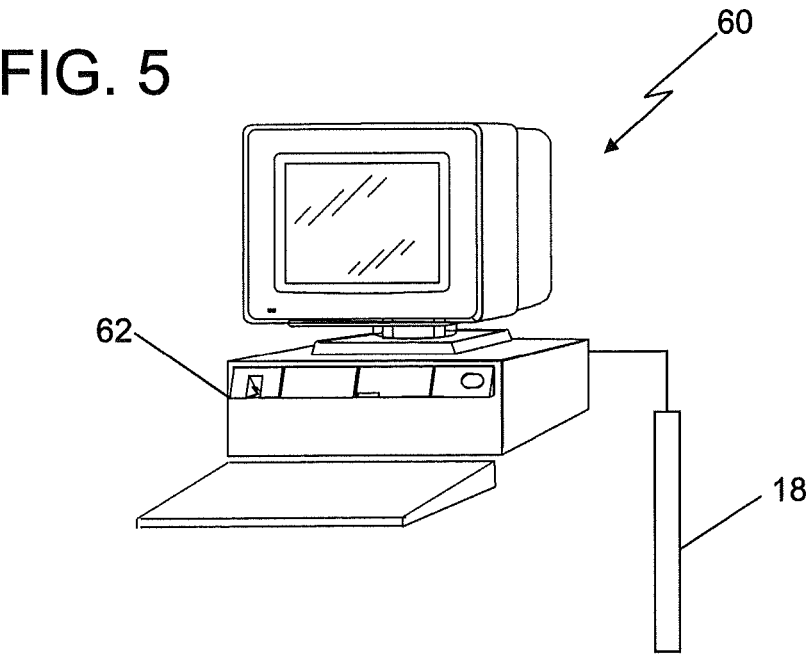
FIG. 5 depicts an exemplary embodiment of a system for measuring a resistivity parameter of an earth formation.

Referring to FIG. 5, there is provided a system 60 for assessing a resistivity parameter of the formation 14. The system may be incorporated in a computer or other processing unit capable of receiving data from the tool. The processing unit may be included with the tool 18 or included as part of the surface processing unit 32. The processing unit is configured to execute the method 50.

In one embodiment, the system 60 includes a computer 62 coupled to the tool 18. Exemplary components include, without limitation, at least one processor, storage, memory, input devices, output devices and the like. As these components are known to those skilled in the art, these are not depicted in any detail herein. The computer 62 may be disposed in at least one of the surface processing unit 32 and the tool 18.

Generally, some of the teachings herein are reduced to an algorithm that is stored on machine-readable media. The algorithm is implemented by the computer 62 and provides operators with desired output.

The systems and methods described herein provide various advantages over existing processing methods and devices. The systems and method utilize orthogonal measurement signals that eliminate the influences of cross-talk and leakage currents. In addition, the systems and methods described herein avoid the need for equal potential driving, which can include an operational delay that compromises the accuracy of resistivity measurements.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the system and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method of measuring a resistivity parameter of an earth formation, the method comprising:
    applying a first electric measurement current including a first series of pulses to a first electrode and inducing a first formation current in the earth formation;
    applying a second electric measurement current including a second series of pulses to a second electrode and inducing a second formation current in the earth formation, the first series of pulses and the second series of pulses occupying distinct portions of a time domain in a selected time window;
    measuring the first measurement current, the first formation current, the second measurement current and the second formation current by coherent in-phase demodulation; and
    calculating at least one resistivity parameter by i) comparing the first measurement current to the first formation current and ii) comparing the second measurement current to the second formation current.

2. The method of claim 1, wherein the first measurement current and the second measurement current are pulsed currents having a selected frequency and are supplied via a generator coupled to a power source.

3. The method of claim 2, wherein the generator is a maximum length sequence (MLS) generator.

4. The method of claim 3, wherein the first electric measurement current and the second electric measurement current are identical MLS sequences.

5. The method of claim 1, wherein the resistivity parameter is selected from a formation impedance and a formation resistivity.

6. The method of claim 1, wherein the first electrode includes a first conductive coil having a first magnetic dipole moment, and the second electrode includes a second conductive coil having a second magnetic dipole moment that is orthogonal to the first magnetic dipole moment.

7. The method of claim 1, further comprising calculating at least one of a phase shift and a gain between the first measurement current and the first formation current, and between the second measurement current and the second formation current.

8. The method of claim 1, wherein the first measurement current is applied during a first time window and the second measurement current is applied during a second time window distinct from the first time window.

9. The method of claim 1, wherein calculating the resistivity parameter includes calculating at least one of a gain, a phase shift, a current change and a voltage change.

10. The method of claim 1, wherein the first electrode and the second electrode are disposed on a resistivity imager pad.

11. A system for measuring a resistivity parameter of an earth formation, the system comprising:
    an electric power source;
    a generator coupled to the power source and configured to emit a pulsed current having a selected frequency;
    a first electrode configured to convey a first measurement current including a first series of pulses into the earth formation and induce a first formation current therein;

a second electrode configured to convey a second measurement current including a second series of pulses into the earth formation and induce a second formation current therein, the first series of pulses and the second series of pulses occupying distinct portions of a time domain in a selected time window;

a first coherent in-phase demodulation detector configured to receive the first formation current calculate a first difference between the first measurement current and the first formation current;

a second coherent in-phase demodulation detector configured to receive the second formation current calculate a second difference between the second measurement current and the second formation current; and a processor configured to estimate the resistivity parameter based on the measured first difference and second difference.

12. The system of claim 11, wherein the generator is a maximum length sequence (MLS) generator.

13. The system of claim 12, wherein the second electric measurement current is orthogonal to the first electric measurement current.

14. The system of claim 12, wherein the first electric measurement current and the second electric measurement current are identical MLS sequences.

15. The system of claim 11, wherein the resistivity parameter is selected from a formation impedance and a formation resistivity.

16. The system of claim 11, wherein the first measurement electrode includes a first conductive coil having a first magnetic dipole moment, and the second measurement electrode includes a second conductive coil having a second magnetic dipole moment that is orthogonal to the first dipole moment.

17. The system of claim 11, wherein the first difference and the second difference are selected from at least one of a phase shift and a gain.

18. The system of claim 11, wherein the generator is configured to emit the first measurement current during a first time window and the second measurement current during a second time window distinct from the first time window.

19. The system of claim 11, further comprising a current detector configured to detect the first measurement current and the second measurement current, the current detector being in communication with the first coherent in-phase demodulation detector and the second coherent in-phase demodulation detector.

20. The system of claim 11, wherein the first electrode and the second electrode are disposed on a resistivity imager pad.

* * * * *